Figures 1, 2, 3, 4, 5, 6, 7:
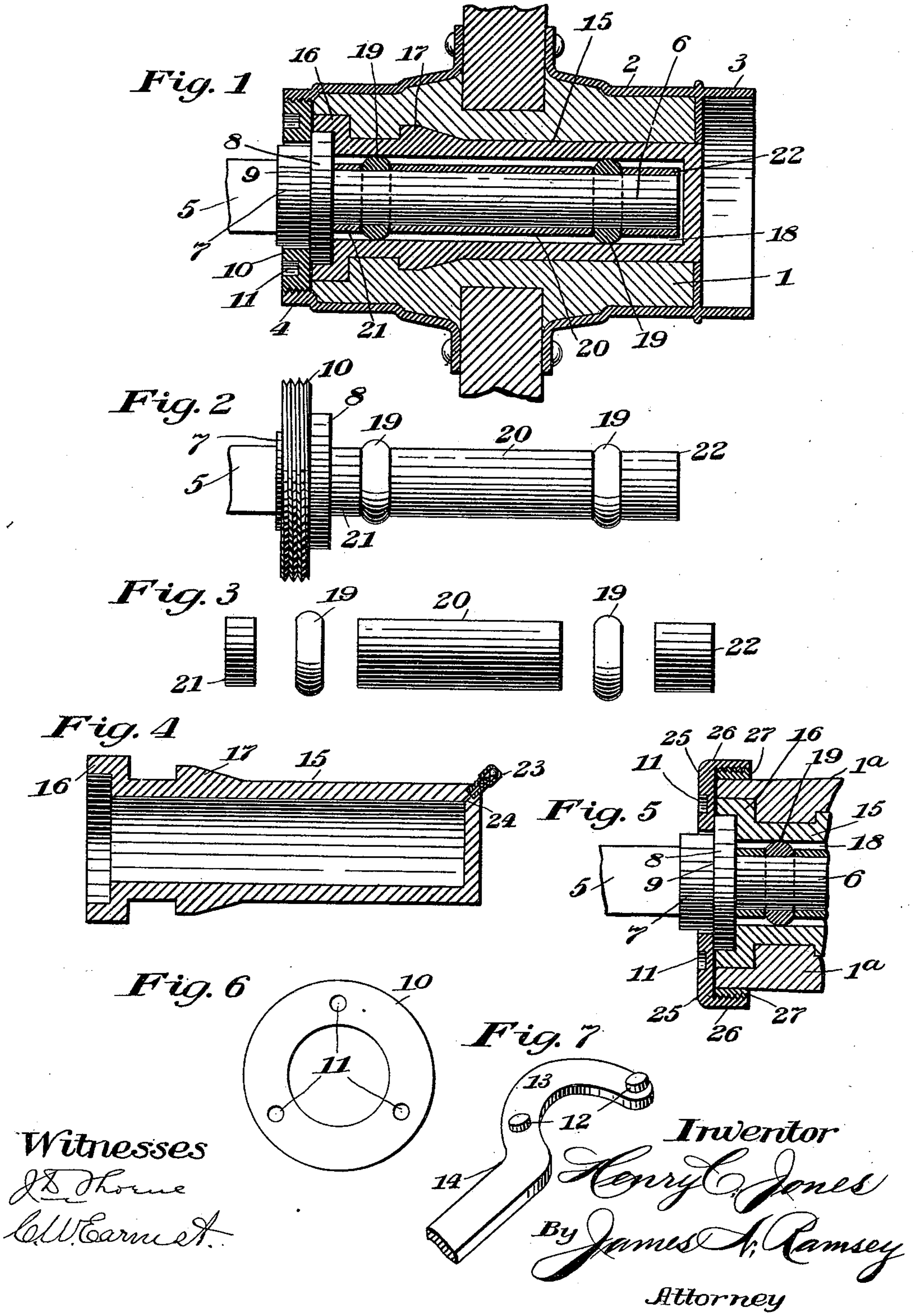

No. 636,807. Patented Nov. 14, 1899.

H. C. JONES.

VEHICLE AXLE.

(Application filed Oct. 24, 1898.)

(No Model.)

Witnesses
J. D. Thorne
C. W. Earnest.

Inventor
Henry C. Jones
By James A. Ramsey
Attorney

THE NORRIS PETERS CO., PHOTO-LITHO., WASHINGTON, D. C.

UNITED STATES PATENT OFFICE.

HENRY C. JONES, OF CINCINNATI, OHIO, ASSIGNOR OF ONE-THIRD TO FREDERICK S. LEE, OF SAME PLACE.

VEHICLE-AXLE.

SPECIFICATION forming part of Letters Patent No. 636,807, dated November 14, 1899.

Application filed October 24, 1898. Serial No. 694,399. (No model.)

*To all whom it may concern:*

Be it known that I, HENRY C. JONES, a citizen of the United States, residing at Cincinnati, in the county of Hamilton and State of Ohio, have invented certain new and useful Improvements in Vehicle-Axles, of which the following is a specification.

My invention relates to certain improvements in vehicle-axles, and especially that class of such devices wherein means are provided for reducing the friction between the spindle of the axle and the box of the wheel-hub; and the object of my invention is to provide an axle of this character of a simple, inexpensive, and durable nature, having antifriction devices adapted for adjustment to take up wear, the construction being such that the friction between the spindle and box is reduced to a minimum and also such as to effectually exclude dust and the like from the bearing-surface, whereby the life of the axle is materially lengthened.

My invention consists in certain novel features of the construction, combination, and arrangement of the several parts of the improved axle whereby certain important advantages are attained and the device is made simpler, cheaper, and otherwise better adapted and more convenient for use than various other similar devices heretofore employed, all as will be hereinafter fully set forth.

The novel features of the invention will be carefully defined in the claims.

In the accompanying drawings, which serve to illustrate my invention, Figure 1 is a sectional view taken axially through a wheel-hub and showing the same mounted on an axle having antifriction devices embodying my invention; and Fig. 2 is a view showing the end portion or spindle of the axle, together with the bearing devices carried thereon. Fig. 3 is a view showing the bearing devices detached from the spindle. Fig. 4 is a sectional view taken axially through the hub-box detached. Fig. 5 is a partial sectional view similar to Fig. 1, but showing a modified arrangement of the parts. Fig. 6 is a detail view showing one of the movable collars employed in the construction shown in Fig. 1, detached. Fig. 7 is a fragmentary perspective view showing a spanner-wrench adapted for use in holding the movable collar locked to the axle while the wheel is being removed.

Referring first to the drawings, 1 indicates the hub of the wheel, having a casing or reinforce 2, of metal, extending over it in a well-known way and projecting at its ends to form flanges 3 and 4, encircling the ends of the hub.

5 indicates the axle, usually of rectangular cross-section, having a rounded spindle 6 to receive the wheel, said spindle being separated from the body portion of the axle by means of flanges 7 and 8 produced thereon. The flanges 7 and 8 are of different diameters, the outer flange 8 being the larger, so as to produce at the inner side thereof a shoulder 9, extending around the axle and against which is arranged to bear a movable collar 10, centrally perforated to fit over the flange 7, as clearly shown in Figs. 1 and 6. The movable collar is circular in form, being exteriorly screw-threaded, as shown in the drawings, so as to screw into the annular flange 4 at the inner end of the hub 1, and the face of said collar 10 is formed with recesses or sockets 11 to receive lugs 12 on a spanner-wrench 14, (see Fig. 7,) having a bent portion 13 to take over the axle. By this construction it will be seen that when the movable collar 10 is screwed home into the flange 4 of the hub it will serve by engagement with the shoulder 9 of the axle to hold the wheel in place on the axle; but when it is desired to remove the wheel it is only necessary to apply the spanner-wrench 14 over the axle, the bend 13 fitting the top surface of the axle, so as to be held upon the same, and the lugs 12 engaging the recesses 11 in the movable collar, after which the wheel may be turned to unscrew the movable collar from the flange 4.

15 indicates the hub-box closed at its outer end and having a socket 16 at its inner end to receive the collar or flange 8 of the axle, said box being provided in the usual way with lugs 17 to hold it against turning in the hub 1 and being of greater interior diameter than the diameter of the spindle 6 of the axle, which fits in said interior, so as to form between the box and said spindle an annular chamber or space 18, wherein are arranged the antifriction devices, which I will now describe. These devices comprise two bearing-rings 19, of annular form, each having an interior diameter to fit snugly on the spindle 6 and an exterior diameter to fit the interior hollow of the axle-box 15, as clearly shown in Fig. 1. The outer surface or periphery of each ring 19 is preferably rounded, the ring being made semicircular in cross-section, so as to further reduce the bearing-surface whereon the box 15 turns. These bearing-rings will be made from hardened metal and are held spaced apart upon the spindle 6 by means of a central or intervening collar or sleeve 20 and end sleeves or collars 21 and 22 of different lengths, said sleeves or collars acting, as will be apparent on inspection of the drawings, to hold the bearing-rings against movement lengthwise on the spindle and being capable by reason of their different lengths of being interchanged, so that in case the box shall become worn at its points of engagement with the rings 19 the outer collars or sleeves may be interchanged to afford new bearing-surfaces for the rings 19 in the box 15.

The box 15 is by preference made of such length as to project, as clearly shown in Fig. 1, through the outer end of the hub 1, and in order to permit the bearing devices inclosed in the box to be conveniently lubricated I provide the outer end of said box with an oil-valve 23, (see Fig. 4,) controlling a duct 24, leading diagonally to the interior chamber 18, between the spindle 6 and said box, so that said chamber may be conveniently filled with oil to prevent wear of the bearing devices. The chamber 18 is of such dimensions as to hold a sufficient supply of lubricant to keep the parts thoroughly oiled for a considerable time.

The improved axle constructed as above set forth is of an extremely simple and inexpensive nature and is especially well adapted for use, since it is thoroughly dust-proof and is further capable of being readily taken apart and assembled when desired for purposes of repair or cleaning. Furthermore, the construction is such that the bearing-rings 19 act to materially reduce the friction and consequent wear of the parts, and by the arrangement of the collars or sleeves by which said rings are held against movement lengthwise on the spindle the life of the axle is considerably augmented, since by simple interchangement of said collars or sleeves new bearing-surfaces are provided for said rings in the axle-box.

It will also be apparent from the above description that the improved axle constructed according to my invention is capable of considerable modification without material departure from the scope and spirit of the invention, and for this reason I do not wish to be understood as limiting myself to the precise form and arrangement of the several parts herein set forth. For example, when the axle is to be employed in connection with a staggered wheel the construction shown in Fig. 5 may be employed. This construction is substantially similar to that above described excepting that the movable collar 25 is made larger in diameter and is provided on its outer face with a projecting annular flange 26, having interior screw-threads to fit a threaded ring 27, shrunk or otherwise secured in the inner end of the hub $1^a$, the hub in this construction being unprovided with a metal casing or reinforce.

Having thus described my invention, what I claim, and desire to secure by Letters Patent, is—

1. An axle having its spindle provided with a plurality of rings held loosely on and projecting from the periphery of said spindle and having interchangeable spacing-sleeves also loosely held on said spindle for holding the rings against movement endwise of the spindle, said rings being adapted to fit in the interior hollow of the axle-box to support the same out of engagement with the surface of the spindle, substantially as set forth.

2. The combination of an axle having a spindle, a box having a hollow of greater diameter than the spindle and closed at one end, whereby a chamber is formed between the box and spindle, means to hold the box on the axle, a plurality of bearing-rings loosely held on and projecting from the periphery of the spindle in said hollow to support the box on the spindle and spacing-sleeves mounted for independent turning movement on the spindle to hold said bearing-rings against movement endwise on the spindle, substantially as set forth.

3. The combination of an axle having a spindle, a box having a hollow of greater diameter than the spindle, whereby a chamber is formed between the box and spindle, means to hold the box on the axle, a plurality of bearing-rings loosely held on and projecting from the periphery of the spindle in said hollow to support the box on the spindle, and interchangeable spacing-sleeves of different lengths on said spindle to hold said bearing-rings against movement endwise on the spindle, substantially as set forth.

4. The combination of an axle having a spindle provided with a collar at the inner end of the spindle and forming a shoulder on its inner face, a hub having a box provided with a hollow of greater diameter than the spindle, whereby a chamber is formed between the box and spindle, a casing on the hub provided with a projecting annular flange at its inner end a plurality of bearing-rings held on and projecting from the periphery of said spindle in said hollow to support the box on the spindle, and a movable collar loose on the axle inside said collar, said collar having threaded engagement with the flange at the inner end of the hub-casing to hold the same to the axle, substantially as set forth.

HENRY C. JONES.

Witnesses:
JAMES N. RAMSEY,
F. S. LEE.